US012531375B2

(12) United States Patent
Reuter et al.

(10) Patent No.: US 12,531,375 B2
(45) Date of Patent: Jan. 20, 2026

(54) CONNECTION ASSEMBLY AND CONNECTOR WITH ROTATABLE POSITION ASSURANCE

(71) Applicant: TE Connectivity Germany GmbH, Bensheim (DE)

(72) Inventors: Jurek Reuter, Bensheim (DE); Konrad Helmut Roth, Bensheim (DE); Markus Kressmann, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 339 days.

(21) Appl. No.: 18/077,596

(22) Filed: Dec. 8, 2022

(65) Prior Publication Data

US 2023/0105340 A1 Apr. 6, 2023

Related U.S. Application Data

(63) Continuation of application No. PCT/EP2021/065201, filed on Jun. 8, 2021.

(30) Foreign Application Priority Data

Jun. 10, 2020 (DE) ..................... 10 2020 207 291.4

(51) Int. Cl.
*H01R 13/641* (2006.01)
*H01R 13/52* (2006.01)
(Continued)

(52) U.S. Cl.
CPC ....... *H01R 13/641* (2013.01); *H01R 13/5205* (2013.01); *H01R 13/6271* (2013.01); *H01R 13/639* (2013.01); *H01R 13/53* (2013.01)

(58) Field of Classification Search
None
See application file for complete search history.

(56) References Cited

U.S. PATENT DOCUMENTS 6,514,098 B2 2/2003 Marpoe, Jr. et al.
7,077,677 B2 * 7/2006 Sanuki ................ H01R 13/623 439/321

(Continued)

FOREIGN PATENT DOCUMENTS

CN 101548440 A 9/2009
CN 102934290 A 2/2013

(Continued)

OTHER PUBLICATIONS

Japanese Office Action dated Feb. 6, 2024 with English translation, corresponding to Application No. 2022-575316, 9 pages.

(Continued)

*Primary Examiner* — Tho D Ta
(74) *Attorney, Agent, or Firm* — Barley Snyder

(57) ABSTRACT

A connection assembly of a connector comprises a connection housing, a locking element and a position assurance device. The connection housing is interconnectable with a counter connection housing along a connection axis. The locking element is movable between a locking position fixing the counter connection housing to the connection housing, and a release position releasing the counter connection housing from the connection housing. The position assurance device movable between a disconnection position, in which the position assurance device permits movement of the locking element from the locking position to the release position, and a blocking position, in which the position assurance device fixes the locking element in the locking position. The position assurance device is rotated about the connection axis on the connection housing when moving between the disconnection position and the blocking position.

20 Claims, 4 Drawing Sheets

(51) Int. Cl.

| | |
|---|---|
| ***H01R 13/627*** | (2006.01) |
| ***H01R 13/639*** | (2006.01) |
| *H01R 13/53* | (2006.01) |

(56) References Cited

U.S. PATENT DOCUMENTS

| | | | | |
|---|---|---|---|---|
| 7,367,833 | B2 | 5/2008 | Matsumoto | |
| 7,399,195 | B2 | 7/2008 | Kim et al. | |
| 8,678,846 | B2 | 3/2014 | Hitchcock et al. | |
| 9,419,375 | B2 | 8/2016 | Dieduksman et al. | |
| 9,887,494 | B2 * | 2/2018 | Leroyer | H01R 13/533 |
| 10,038,278 | B2 | 7/2018 | Lane et al. | |
| 10,177,482 | B2 | 1/2019 | Takamura | |
| 10,348,033 | B2 * | 7/2019 | Stucchi | H01R 13/642 |
| 2003/0148652 | A1 | 8/2003 | Bernardi et al. | |
| 2015/0372417 | A1 | 12/2015 | Dieduksman et al. | |

FOREIGN PATENT DOCUMENTS

| | | | | |
|---|---|---|---|---|
| CN | 104205518 | A | 12/2014 | |
| CN | 105322347 | A | 2/2016 | |
| CN | 105794051 | A | 7/2016 | |
| CN | 109119836 | A | 1/2019 | |
| CN | 210111123 | U | 2/2020 | |
| EP | 2770587 | A1 | 8/2014 | |
| EP | 2960695 | A1 | 12/2015 | |
| JP | S63122450 | U | 8/1988 | |
| JP | H0244269 | U | 3/1990 | |
| JP | 2007179860 | A * | 7/2007 | H01R 13/622 |
| JP | 201645997 | A | 4/2016 | |
| KR | 20180066603 | A | 6/2018 | |
| KR | 20180121647 | A | 11/2018 | |
| WO | 2015119788 | A1 | 8/2015 | |

OTHER PUBLICATIONS

PCT International Search Report and Written Opinion, Application No. PCT/EP2021/065201, Dated: Sep. 9, 2021, 23 pages.

German Office Action, Application No. 10 2020 207 291.4, Dated: May 24, 2022, 5 pages.

Examination Report from the Intellectual Property Office of India dated Feb. 10, 2023, corresponding to Application No. 202247070278, 8 pages.

Korean Office Action dated Jul. 24, 2024 with English translation, corresponding to Application No. 10-2023-7000615 8 pages.

European Patent Office Examination Report dated Aug. 5, 2025, corresponding to Application No. 21 731 140.6-1201, 8 pages.

Chinese Office Action dated Nov. 26, 2025 with English translation, corresponding to Application No. 202180040936.5, 13 pages.

* cited by examiner

CONNECTION ASSEMBLY AND CONNECTOR WITH ROTATABLE POSITION ASSURANCE

CROSS-REFERENCE TO RELATED APPLICATIONS

This application claims the benefit of International Patent Application No. PCT/EP2021/065201 filed on Jun. 8, 2021, the whole disclosure of which is incorporated herein by reference.

FIELD OF THE INVENTION

The present invention relates to a connection assembly of a connector, and more particularly, a high-voltage connector.

BACKGROUND

Connector or connection assemblies including a connector housing and a position assurance or a position assurance device are known from the state of the art. The position assurance, also known as contact position assurance (CPA), is configured such that it secures the interlock between the connector housing and the counter or mating connector housing in a final connection position and prevents this connection from releasing. For this purpose, the position assurance is displaced axially to block the interlock of a locking element and a coupling element of the assembly.

In particular in the automotive sector, transportation and the use of high-voltage connectors, the actuation of the known position assurance devices can undesirably change the seating of a sealing element and, for example, lead to sealing problems with mat seals that are penetrated by a cable. In addition, connector assemblies with a position assurance require many components, are complex and take up a lot of space.

An object of the present disclosure is thus to provide a connector assembly and a connector set which improve the solutions of the prior art with respect to sealing and which are also of simple and compact design.

SUMMARY

According to an embodiment of the present disclosure, a connection assembly of a connector comprises a connection housing, a locking element and a position assurance device. The connection housing is interconnectable with a counter connection housing along a connection axis. The locking element is movable between a locking position fixing the counter connection housing to the connection housing, and a release position releasing the counter connection housing from the connection housing. The position assurance device movable between a disconnection position, in which the position assurance device permits movement of the locking element from the locking position to the release position, and a blocking position, in which the position assurance device fixes the locking element in the locking position. The position assurance device is rotated about the connection axis on the connection housing when moving between the disconnection position and the blocking position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
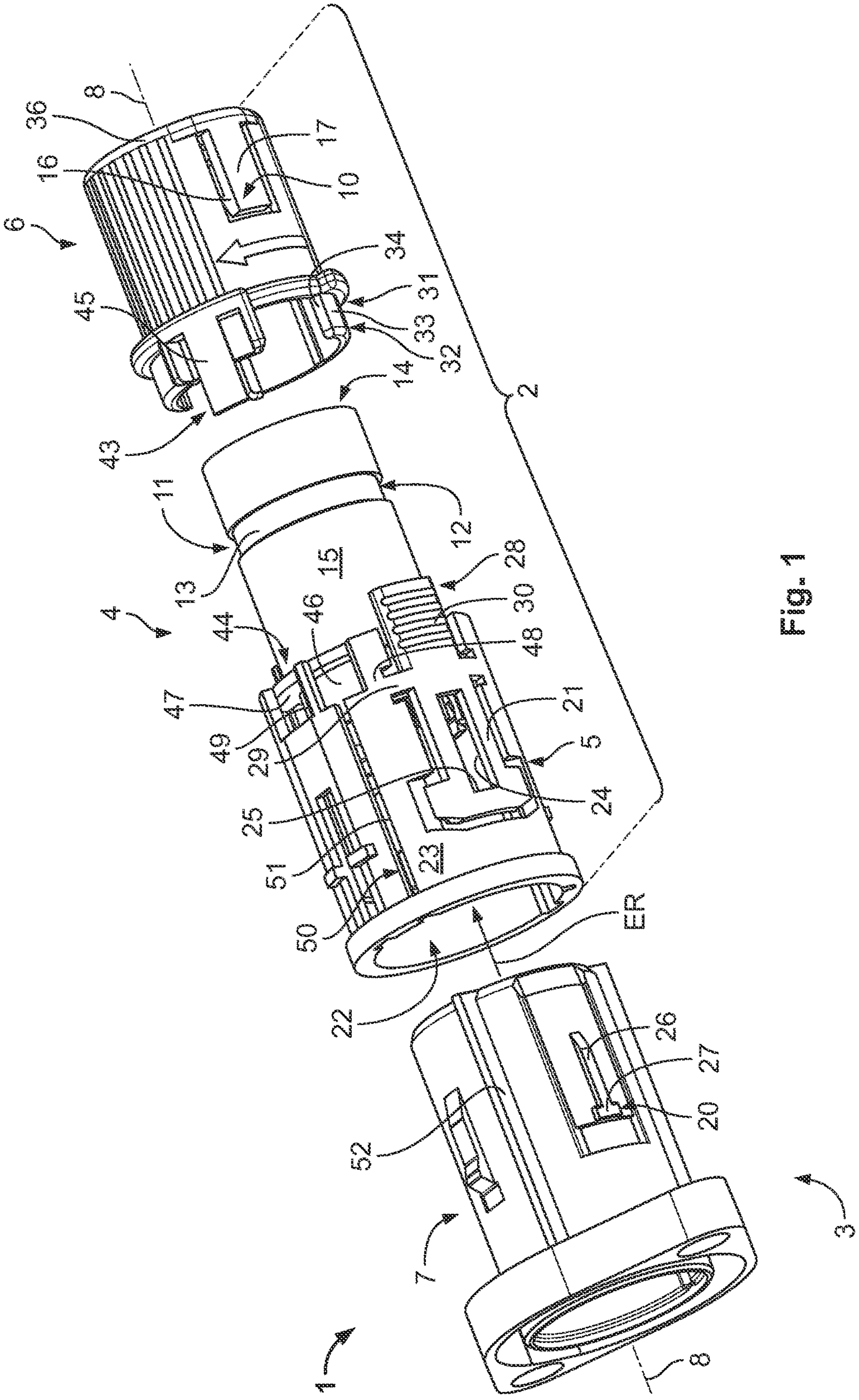
FIG. 1 an exploded view of an exemplary embodiment of the connection assembly or connection set according to the invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 shows a connection set 1 according to a first embodiment of the present disclosure. The connection set 1 comprises a connection assembly 2 according to the invention and a counter connection assembly 3. The connection assembly 2 comprises a connection housing 4, a locking element 5, and a position assurance, or position assurance device or element, 6. The connection housing 4 is configured so as to be able to be interconnected with the counter connection assembly 3, or more particularly a counter connection housing 7 along an connection axis 8. The locking element 5 is movable from a locking position for fixing the counter connection housing 7 into a release position for releasing the counter connection housing 7 from the connection housing 4.

Figure 2:
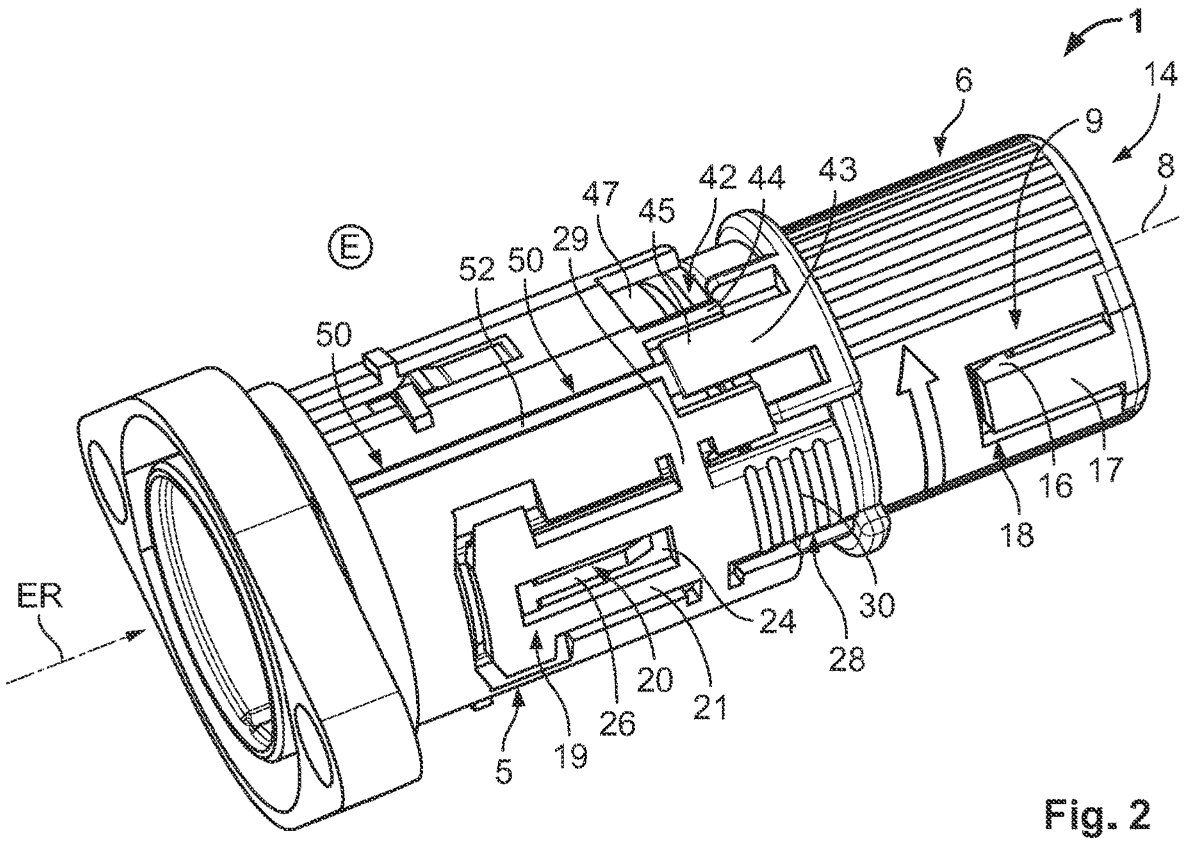
FIG. 2 a perspective view of the connection set according to FIG. 1 in the end connection position, before activation with the position assurance and its disconnection position.
Figure 3:
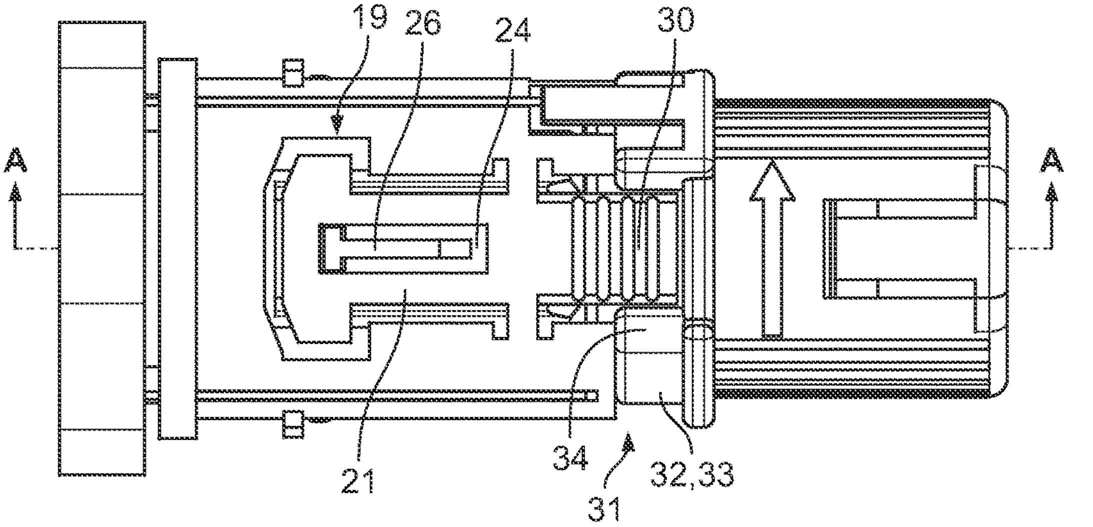
FIG. 3 a schematic top side view of the connection assembly according to FIG. 2.
Figure 4:
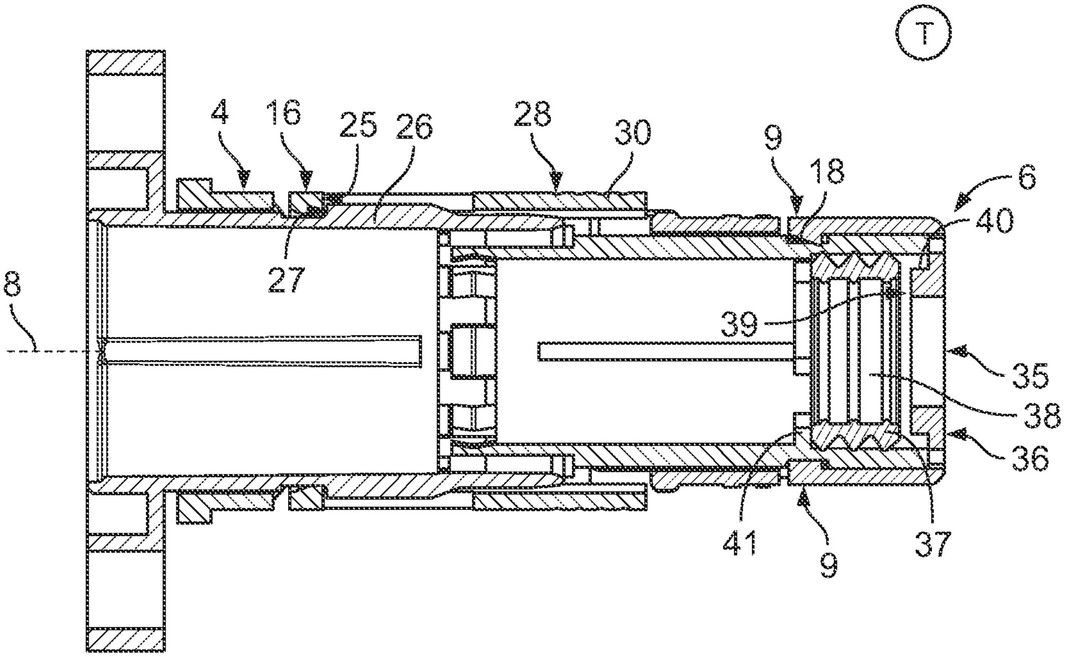
FIG. 4 a sectional view of FIG. 3 along the line of intersection A-A.
Figure 5:
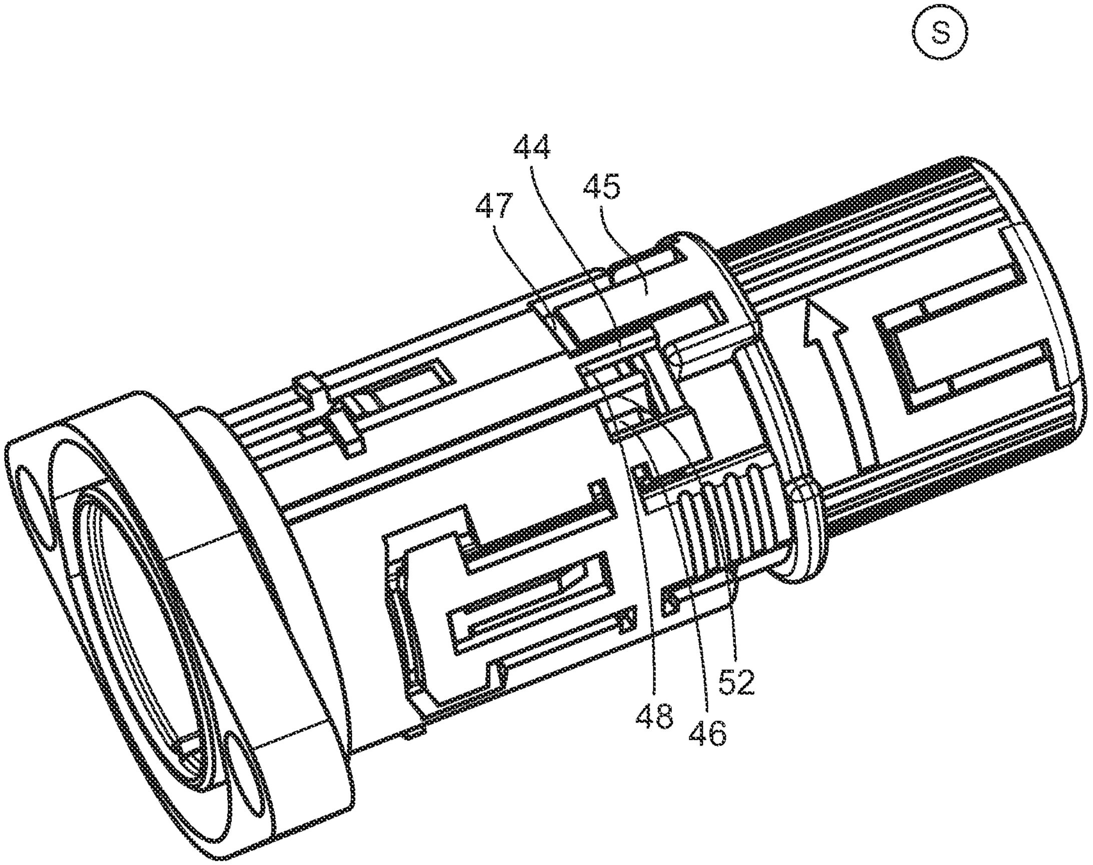
FIG. 5 a perspective view of the connection set according to FIG. 1 in the end connection position, after activation with the position assurance in its blocking position.
Figure 6:
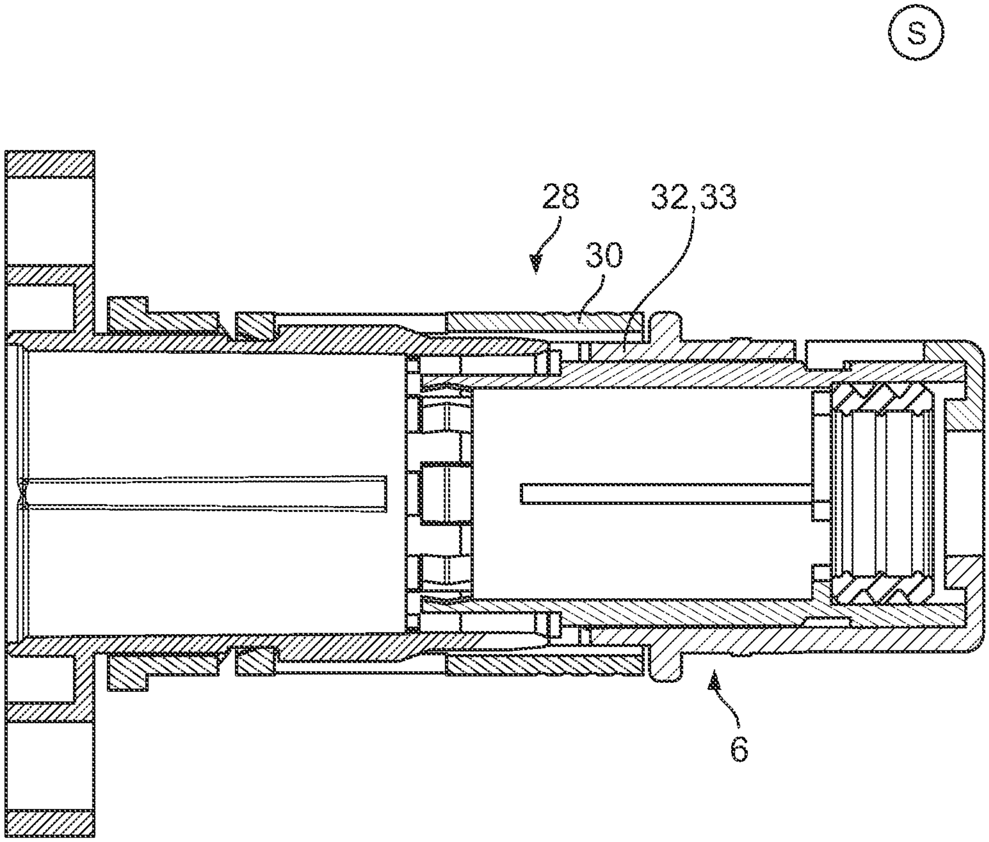
FIG. 6 a sectional view of FIG. 5, the line of intersection of which corresponds to line A-A of FIG. 3.

The position assurance 6 is configured to be transferable or moveable from a disconnection position T (see FIGS. 2 to 4), in which the position assurance 6 permits the movement of the locking element 5 from the locking position into the release position, into a blocking position S (see FIGS. 5 and 6), in which the position assurance 6 blocks the locking element 5 in the locking position. For this purpose, the position assurance 6 is arranged on the connection housing 4 so as to be rotatable about the connection axis 8 for transfer from the disconnection position T to the blocking position S, as can be seen, for example, in FIGS. 2 to 6 and will be explained in detail below.

The position assurance 6 is connected to the connection housing 4 via fastening means 9. This allows the connection assembly to be handled in one piece. The position assurance 6 is captively connected to the connection housing 4. In the embodiment shown, the position assurance is latched to the connection housing 4. For this purpose, the position assurance 6 comprises latching means 10 as fastening means 9. The connection housing 4 is provided with corresponding counter latching means 11. In the embodiment shown, the connection housing 4 comprises a latching receptacle 12, which is formed as a circumferential groove 13. The latching receptacle 12 is formed at the cable-side end 14 of the connection housing 4 or of the connection assembly 2 on the outwardly facing shell surface 15 of the connection housing 4. The latching receptacle 12 extends essentially in a plane that is perpendicular to the connection axis 8.

The position assurance 6 comprises a latching projection 16 as latching means 10. The latching projection 16 can be engaged with the latching receptacle 12. This creates a form fit which connects the position assurance 6 to the connection housing 4 and enables it to be handled in one piece. The latching projection 16 is formed at the distal end of a deflectable latching arm 17. In this way, the position assurance 6 can be pushed onto the cable-side end 14 of the connection housing 4 along the connection axis 8. When pushed onto the connection housing 4, the latching projection 16 hits the connection housing 4, is deflected radially outwards and is thereby elastically deformed. As soon as the latching projection 16 reaches the area of the latching receptacle 12, the restoring force of the deflected latching arm 17 ensures that the latching arm 17 moves back into its rest position and. In the process, the latching projection 16 is inserted into the latching receptacle 12, a form fit is formed, and the position assurance 6 is positively connected to the connection housing 4.

In the exemplary embodiment shown, the fastening means 9 form a pivot bearing 18 for guiding the rotational movement of the position assurance 6 about the connection axis 8. The latching means 10 and the counter latching means 11, thus, the latching projection 16 placed in the latching receptacle, form the pivot bearing 18 which guides the rotational movement of the position assurance 6 about the connection axis relative to the connection housing 4. The pivot bearing 18 thus enables rotation of the position assurance 6 relative to the connection housing 4 about the connection axis 8. In all other directions, in particular against an axial displacement along the connection axis 8, the position assurance 6 is secured to the connection housing 4. The position assurance 6 can only be removed from the connection housing 4, for example, if replacement is necessary, the fastening means 9 are first released, i.e., the latching between the latching means 10 and the counter latching means 11 is unlocked. For this purpose, the latching arm 17 is elastically deflected and the latching projection 16 is moved out of the latching receptacle 12.

The position assurance 6 serves to secure the interlock 19 between the connection housing 4 and the counter connection housing 7 in the end connection position E (see FIGS. 2 to 6), in which the connection housing 4 and the counter connection housing 7 are completely interconnected. On the one hand, this interlock 19 comprises the locking element 5 of the connection assembly 2. In the end connection position, this locking element 5 forms a form-fit with a coupling element 20 of the counter connection housing 3. This form-fit connection, i.e., the interlock 19, secures the connection housing 4 and counter connection housing 7 in their end connection position. The two parts can only be disconnected again when the interlock 19 is released. To release the interlock, the locking element 5 must be moved from its locking position to a release position.

In the illustrated embodiment, the connection housing 4 is provided with a locking lug 21. The locking lug 21 can be deflected radially with respect to the connection axis 8 from the cubature 23 of the connection housing 4 at its end facing the connector face 22. The connector face 22 is located at the end of the connection housing 4 opposite the cable-side end 14, and represents the area at which the counter connection housing 7 is inserted into the connection housing 4 during interconnection. The locking lug 21 is provided with a locking slot 24 which runs essentially parallel to the connection direction ER and has a locking stop 25 on its side facing in the direction of the connector face 22. At the locking stop 25, the locking element 5 is engaged with the coupling element 20.

The coupling element 20 is formed as a coupling rib 26. The coupling rib 26 is arranged on the outside of the counter connection housing 7 and runs essentially parallel to the connection axis 8. When interconnecting the connection housing 4 and the counter connection housing 7, the coupling rib 26 is guided along below the locking lug 21 at the height of the locking slot 24. As the locking lug 21 hits the coupling rib 26, its free-moving part pointing in the direction of the connector face 22 is deflected radially outwards until the coupling rib 26, specifically a coupling shoulder 27 thereof, is guided past the stop 25. After the coupling shoulder 27, the coupling rib 26 ends and the locking lug 21 can thus fall back into its rest position, in which it is essentially arranged in the cubature 23 of the connection housing 4.

In the end or final connection position E, the coupling shoulder 27 engages with the locking stop 25, engaging behind it along the connection direction ER. In the end connection position, the connection housing 4 and the counter connection housing 7 are latched together and secured to each other. Only when the form fit of the locking lug 19 is released by lifting the free-moving end of the locking lug 21 pointing in the direction of the connector face 22 radially outwards, the counter connection housing 7 can be pulled out of the connection housing 4 along the connection axis E, against the connection direction ER, since the coupling shoulder 27 is then no longer engaged with the locking stop 25.

In order to bring about this release position with the locking lug 21 lifted radially outwards, an actuation element 28 is to be operated in the exemplary embodiment. The actuation element 28 can be operated radially to the connection axis 8 and is coupled to the locking element 5. In the exemplary embodiment, a rocker bearing 29 is provided as the coupling. On one side of the rocker bearing 29, the locking lug 21 is attached with its area facing in the direction of the cable-side end 14, wherein the locking lug 21 as a whole is located on the side of the rocker bearing 29 pointing in the direction of the connector face 22. The actuation element 28 is arranged on the opposite side of the rocker bearing 29 pointing in the direction of the cable-side end 14. In the embodiment shown, the actuation element 28 is configured as a finger key 30. The finger key 30 forms a haptically recognizable pressure field on which the actuation element 28 is mounted so that it can be operated radially to the connection axis 8, specifically so that it can be moved downwards towards the connection axis 8 in the direction of the interior of the connection housing 4. During operation, the actuation element 28 moves inwards, towards the interior of the connection housing 4, while the free end of the locking lug 21 with the locking stop 25 is lifted in the opposite direction, i.e., radially outwards, and the interlock 19 is released.

In order to prevent the locking element 5 from being unintentionally moved into the release position, thus blocking operation of the actuation element 28, the position assurance 6 is provided, which in its blocking position blocks the locking element 6 in its locking position. The position assurance 6 comprises a blocking area 31 which fixes the locking element 5 in the blocking position. A blocking organ 32 is provided in the blocking area 31, which in the embodiment shown is configured as a blocking latch 33. When the position assurance 6 is transferred by rotation relative to the connection housing 4 about the connection axis 8, the blocking organ or element 32, specifically the blocking latch 33, is moved into a position in which it blocks the locking element 5 in its latched locking position (see FIGS. 5 and 6). In the embodiment shown, the blocking latch 33 is engaged with the actuation element 28 such that the actuation element 28 cannot be operated. During the activating rotation of the position assurance 6, the blocking latch 33 moves under the actuation element 28. The actuation element 28 then cannot be pressed radially downwards, towards the interior of the connection housing 4. It is blocked by the blocking latch 33 and is unable to move the locking element 5 coupled to it into the lifted release position for releasing the counter connection housing 7. The blocking organ 32 thus blocks the actuation element 28.

The blocking latch 33 is formed in a curved shape, wherein its curvature corresponds to the curvature on the outside of the connection housing 4. In this way, a very compact shape is achieved. The curved blocking latch 33 can rotate along the outside of the connection housing 4. The free, front end of the blocking latch 33, which first interacts with the locking element 5, in the specific embodiment the actuation element 28, when the position assurance 6 is activated, is provided with an insertion chamfer 34. This chamfer promotes moving the blocking latch 33 under the actuation element 28 into the space that lies in the radial direction between the actuation element 28 and the outside of the shell surface 15 of the connection housing 4, into which space the actuation element 28 dips during its operation.

In the exemplary embodiment shown in the figures, the position assurance 6 is attached to the connection housing 4 at the cable end 14. The position assurance 6 is cap-shaped, in the form of a slip-on cap. Due to its configuration as a slip-on cap, the position assurance 6 fulfills two functions in one component in a preferred manner. First, the position assurance 6 ensures that the locking element 5 can be blocked in the blocking position. Furthermore, the cap-shaped position assurance 6 ensures that the cable-side end 14 of the connection housing 4 is covered and protected against dirt and moisture.

In order to allow a cable access to the interior of the connection housing 4, the cap-shaped position assurance 6 comprises a cable passage 35. The cable passage 35 is formed centrally in the end face 36 of the cap-shaped position assurance 6, which in the assembled state is arranged in the plane perpendicular to the connection axis 8 and covers the cable-side end 14 of the connection housing 4. Through this cable passage 35, which could also be referred to as cable inlet or cable receptacle opening, a cable can be fed into the interior of the connection housing, where it is connected to the contact arrangement (e.g., a conductive terminal).

In order to seal the cable passage 35, the connection assembly 2 shown in the figures is provided with a sealing element 37. The sealing element 37 is arranged on the position assurance 6. The sealing element 37 shown comprises a cable aperture 38. The cable aperture 38 of the sealing element 37 is aligned in the connection axis 8 with the cable passage 35 in the end face 36 of the cap-shaped position assurance 6. Cable passage 35 and cable aperture 38 thus form, in the connection direction E, a cable duct for passing a cable into the interior of the connection housing 4. The sealing element 37 is provided as a radial seal for enclosing and sealing the cable in the radial direction. In the embodiment shown, the sealing element 37 is formed as a mat seal for a cable.

The position assurance 6 of the embodiment shown in the figures thus fulfills a further function, namely that of a seal seat or seal holder 39. As seal holder 39, the edge of the cable aperture 38 is designed as a projecting collar 40 pointing into the cap, which in the assembled state prevents the sealing element 37 from being removed from the opening of the connection housing 4 at the cable-side end 14. In the opposite direction, the sealing element 37 is fixed by a seal projection 41 which projects into the interior of the connection housing 4 at the inner wall of the connection housing. In the radial direction, the sealing element 37 adjoins the inner wall of the connection housing 4.

In order to prevent the position assurance 6 from being moved about the connection axis 8 relative to the connection housing 4 before the connection housing 4 is fully assembled with the counter connection housing 7 in the end connection position E, a rotation block 42 is provided. The rotation block 42 prevents the transfer of the position assurance 6 from the disconnection position T to the blocking position S. In the embodiment shown, the rotation block 42 is configured as a releasable form fit between the connection housing 4 and the position assurance 6. The rotation block 42 comprises a movable blocking element 43 and a rigid blocking body 44. The rigid blocking body 44 is formed on the connection housing 4 and the movable blocking element 43 is formed on the position assurance 6. In the embodiment shown, the movable blocking element 43 is a form-fitting element that can be deflected from its rest position radially with respect to the connection axis 8. Specifically, the deflectable form-fitting element is a blocking tongue 45 which projects from the cap-shaped base body of the position assurance 6, when it is connected to the connection housing 4, in the direction of the connector face 22 and extends essentially parallel to the connection axis 8.

A first receiving pocket 46 is provided on the outside of the connection housing 4. The distal end of the blocking tongue 45 moves into this first receiving pocket 46, which could also be called a releasing pocket, when the position assurance 6 is connected to the connection housing 4 by placing the position assurance 6 on the cable-side end 14 of the connection housing 4. A second receiving pocket 47, which could also be called a blocking pocket, is provided on the outside of the connection housing 4. The blocking pocket 47 lies along the connection axis 8 at the same height as the releasing pocket 46. In the circumferential direction, the receiving pockets 46 and 47 lie next to each other. The two receiving pockets 46 and 47 are separated from each other by the rigid blocking body 44. The blocking body 44 thus separates the two receiving pockets 46 and 47 from each other. On one side of the blocking body 44, which faces the releasing pocket 46, the blocking body 44 has a stop shoulder 48. This stop shoulder 48 limits the blocking tongue 45 in the first receiving pocket 46 and thus blocks the rotational movement of the blocking element 43, which would be required to transfer the position assurance 6 from the disconnection position T to the blocking position S.

The area of the blocking body 44 which points into the second receiving pocket 47, the blocking pocket, is provided with a ramp slope 49. In contrast to the stop shoulder 48, which forms a wall, past which the blocking tongue 45, which is in its rest position, cannot be moved, the ramp slope 49 forms a ramp and enables the position assurance 6 to be moved back from its blocking position S to the disconnection position T without the rotation block 42 having to be released first. If the blocking tongue 45 is in the blocking pocket 47, the position assurance 6 is in the blocking position S, and if the position assurance 6 is rotated to move it back from the blocking position S to the disconnection position T, the blocking tongue 45 slides up the ramp slope 49 of the blocking body 44, is thereby deflected from its rest position and, as soon as the blocking tongue 45 has passed the stop shoulder 48, falls back into its rest position in the first receiving pocket 46.

The rotation block 42 in the exemplary embodiment shown is thus a unilateral, directional block which permits movement of the position assurance 6 from the disconnection position T to the blocking position S only after the rotation block 42 has been released, but permits the reverse transfer from the blocking position S to the disconnection position T at any time. In order to release the rotation block 42 in the disconnection position T of the position assurance 6, the movable blocking element 43 must be lifted from its rest position, i.e., the blocking tongue 45 must be moved radially outwards, away from the interior of the connection housing 4 out of the releasing pocket 46, which is described in detail below.

The exemplary embodiment of the connection assembly 2 shown in the figures comprises at least one connection guide 50. The connection guide 50 runs parallel to the connection axis 8 and is aligned with the rotation block 42, specifically the first receiving pocket 46. A guide channel 51 for receiving a polarizing rib 52 of the counter connection assembly 3 is provided as the connection guide 50 in the connection housing 4. The connection guide 50 thus not only forms a guide which guides the interconnection of the connection housing 4 and the counter connection housing 7, but at the same time ensures that the connection assembly 2 and the counter connection assembly 3 are also correctly connected to one another with regard to their rotation about the connection axis.

As the connection guide 50 opens into the first receiving pocket 46, a portion of the polarizing rib 52 can be inserted all the way into the releasing pocket 46 during interconnection. In the end connection position E, therefore, the front part of the polarizing rib 52, which is first inserted into the connector face 22, extends into the releasing pocket 46 and engages under the blocking tongue 45, which is thereby lifted radially outwards and moved out of the releasing pocket 46. In this position (see FIGS. 2-4), the rotation block 42 is released.

The following is a brief summary of how the connection assembly 2 or the connection set 1 is assembled and functionally handled. First, the connection assembly 2 is mounted by placing the cap-shaped position assurance 6 on the cable-side end 14 of the connection housing 4. During this placement, the latching arm 17 of the position assurance 6 is inserted into the circumferential groove 13 on the outside of the connection housing 4 and the position assurance 6 is positively connected to the connection housing 4. Furthermore, the distal end of the blocking element 43 moves into the releasing pocket 46 and the sealing element 37 is fixed along the connection axis 8 by the seal projection 41 of the connection housing 4 on the one hand and by the collar 40 of the position assurance 6 on the other hand.

The connection assembly 2 can now be interconnected with the counter connection assembly 3. For this purpose, the counter connection housing 7 is inserted into the connector face 22 along the connection axis 8, specifically in the connection direction ER, with the polarizing rib 52 being threaded into the guide channel 51 of the connection guide 50. When the connection set 1 is in its end connection position E, connection assembly 2 and counter connection assembly 3 are completely joined together, the locking element 5 latches with the coupling element 20 and this locking 19 prevents the connection assembly 2 and counter connection assembly 3 from being disconnected from each other against the connection direction ER. Disconnection is only possible when the locking element 5 is moved into the release position by operating the actuation element 28 and the interlock 19 between the connection assembly 2 and counter connection assembly 3 is released.

In order to prevent unintentional transfer of the locking element 5 to the release position, the position assurance 6 is rotated and thereby transferred from the disconnection position T to the blocking position S. In the end connection position E, the front part of the polarizing rib 52 projects into the releasing pocket 46 and lifts the blocking tongue 45 out of the releasing pocket 46. The rotation block 42 is thus released in the end connection position E and allows the position assurance 6 to be rotated relative to the connection housing 4 about the connection axis 8 from the disconnection position T into the blocking position S. During this rotation, the blocking tongue 45 is guided past the blocking body 44 and finally comes to rest in its rest position in the blocking pocket 47. At the same time, the blocking area 31, namely the blocking latch 33 slides under the actuation element 28, which is thereby blocked and can no longer be operated to move the locking element into the release position. Only when the position assurance 6 is moved back from the blocking position S to the disconnection position T, the actuation element 28 can be operated again, i.e. pushed radially downwards, wherein the locking element 5 moves into the release position, which cancels the interlock 19 with the coupling element 20 and allows disconnection of the connection assembly 2 and counter connection assembly 3.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connection assembly of a connector, comprising:

a connection housing interconnectable with a counter connection housing along a connection axis;

a locking element movable between a locking position fixing the counter connection housing to the connection housing, and a release position releasing the counter connection housing from the connection housing;

a position assurance device movable from a disconnection position, in which the position assurance device permits movement of the locking element from the locking position to the release position, to a blocking position, in which the position assurance device fixes the locking element in the locking position, the position assurance device is rotated about the connection axis on the connection housing when moving between the disconnection position and the blocking position; and a releasable rotation block preventing motion of the position assurance device between the disconnection position and the blocking position.

2. The connection assembly according to claim 1, further comprising an actuation element adapted to move the locking element from the locking position to the release position.

3. The connection assembly according to claim 1, wherein the position assurance device is connected to the connection housing via a fastening latch.

4. The connection assembly according to claim 3, wherein the fastening latch defines a pivot bearing guiding the rotational movement from the position assurance device about the connection axis.

5. The connection assembly according to claim 1, wherein the position assurance device includes a blocking element fixing the locking element in the blocking position.

6. The connection assembly according to claim 5, wherein the blocking element blocks the actuation element in the blocking position.

7. The connection assembly according to claim 6, wherein the position assurance device is arranged on a cable-side end of the connection housing.

8. The connection assembly according to claim 7, wherein the position assurance device comprises a cap fitted over the cable side end of the connection housing.

9. The connection assembly according to claim 1, further comprising a sealing element arranged on the position assurance device.

10. The connection assembly according to claim 9, wherein the sealing element defines a cable aperture therethrough.

11. The connection assembly according to claim 1, wherein the rotation block includes a movable blocking element and a rigid blocking body.

12. The connection assembly according to claim 11, wherein the rigid blocking body is formed on the connection housing and the movable blocking element is formed on the position assurance device.

13. The connection assembly according to claim 1, wherein the connection housing includes at least one connection guide adapted to guide the interconnection of the connection housing and the counter connection housing in a direction parallel to the connection axis.

14. The connection assembly according to claim 13, wherein the connection guide is aligned with the rotation block.

15. A connection assembly, comprising:

a connection housing;

a counter connection housing interconnectable with the connection housing along a connection axis;

a locking element movable between a locking position fixing the counter connection housing to the connection housing and a release position releasing the counter connection housing from the connection housing;

a position assurance device movable between a disconnection position in which the position assurance device permits movement of the locking element from the locking position to the release position, and a blocking position in which the position assurance device blocks the locking element in the locking position, the position assurance device rotated about the connection axis on the connection housing when moving between the disconnection position to the blocking position; and a releasable rotation block preventing motion of the position assurance device between the disconnection position and the blocking position.

16. The connection assembly according to claim 15, further comprising a fastening element fixing the position assurance device to the connection housing in an axial direction, and guiding rotation movement of the position assurance device relative to the connection housing about the connection axis.

17. The connection assembly according to claim 15, further comprising an actuation element adapted to move the locking element from the locking position to the release position, the position assurance device including a blocking element fixing the locking element in the blocking position by preventing movement of the actuation element.

18. The connection assembly according to claim 15, wherein the rotation block includes a movable blocking element and a fixed blocking body.

19. The connection assembly according to claim 15, further comprising a connection guide fixing the relative orientation of the connection housing and the counter connection housing about the connection axis.

20. A connection assembly of a connector, comprising:

a connection housing interconnectable with a counter connection housing along a connection axis;

a locking element movable between a locking position fixing the counter connection housing to the connection housing, and a release position releasing the counter connection housing from the connection housing;

a position assurance device movable from a disconnection position, in which the position assurance device permits movement of the locking element from the locking position to the release position, to a blocking position, in which the position assurance device fixes the locking element in the locking position, the position assurance device is rotated about the connection axis on the connection housing when moving between the disconnection position and the blocking position; and a sealing element arranged on the position assurance device.

* * * * *